July 4, 1967 A. ROQUE V 3,329,192
AIRLESS TIRE
Filed Aug. 5, 1965

INVENTOR
Alfredo Roque V

BY Bailey, Stephens and Huettig
ATTORNEYS

United States Patent Office 3,329,192
Patented July 4, 1967

3,329,192
AIRLESS TIRE
Alfredo Roque V, Apartado 952, Managua, Nicaragua
Filed Aug. 5, 1965, Ser. No. 477,456
7 Claims. (Cl. 152—327)

This invention relates to an airless vehicle tire which is used without an innertube or internal air pressure.

So-called airless tires are known which are reinforced by metal wires such as disclosed by Kunel U.S. Patent No. 2,749,959. However, it has been found that, because of the lack of air pressure within the tire, difficulty is encountered in holding the tire on the rim of the wheel to which it is attached.

The object of this invention is to produce a structure by means of which an airless tire is firmly held on the rim of the wheel to which it is attached.

In general, the objects of the invention are obtained by providing a plurality of flexible struts between the bead portions of the tire and surrounding each strut with a compression spring. The bead portion of the tire has a greater width than the rim of the wheel and thus must be compressed when fitted to the wheel. The struts and springs exert an outward force to press the bead portions of the wheel tightly against the rim of the wheel. In addition, the bead portions of the tire are provided with a plurality of sockets, preferably aligned respectively with each strut, and the rim of the wheel has corresponding pins insertable in the sockets. Thus the wheel hangs or is suspended from the pins inserted in the upper half of the tire, whereas in conventional constructions, the wheel only bears on the lower half of the tire. This feature further counters the tendency of the tire to come off the rim of the wheel and also prevents the tire from sliding around on the rim of the wheel.

The means by which the objects of the invention are obtained are described more fully with reference to the accompanying drawings in which.

Figure 1:
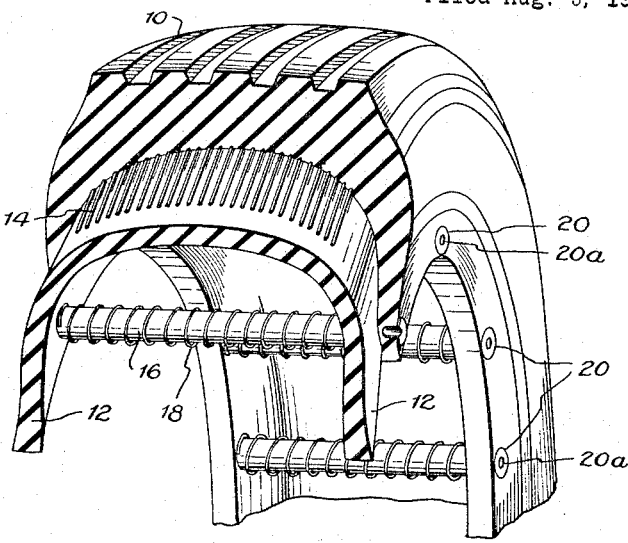
FIGURE 1 is a perspective view of a segment of a tire partly shown in section.
Figure 4:
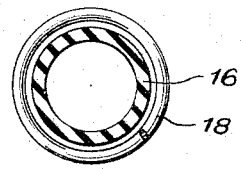
FIGURE 4 is a cross-sectional view on the line 4—4 of FIGURE 3.

The tire is composed of a body 10 having bead portions 12. A plurality of reinforcing steel wires 14 is embodied in a tire body.

Extending between the bead portions 12 is a plurality of flexible struts 16 preferably composed of rubber tires vulcanized to the bead portions 12 so as to form a single-piece construction. Struts 16 extend concentrically around the center of the tire and are spaced an angle of 30° from each other. Surrounding each strut 16 is a steel compression spring 18. The distance between the tread or bead portions 12 when the tire is off of the wheel is greater than the distance between the rim flanges of the wheel, as is clearly shown by a comparison of FIGURES 2 and 3.

Located in the outer surfaces of the bead portions and preferably in alignment with the struts 16 is a plurality of sockets 20 which are covered with metal eyelets 20a in order to protect them from wear.

Figure 2:
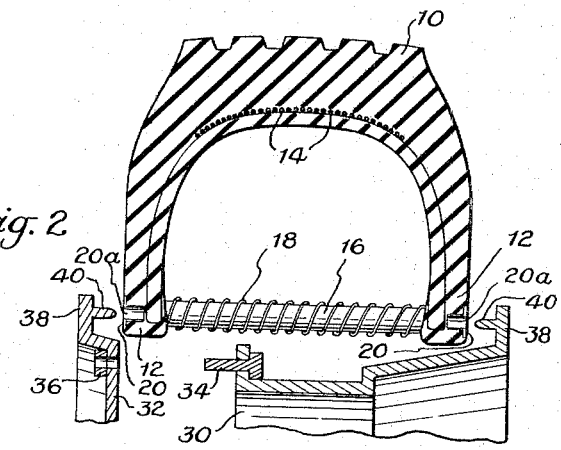
FIGURE 2 is a cross-sectional view of a tire before it is mounted on the rim of a wheel.
Figure 3:
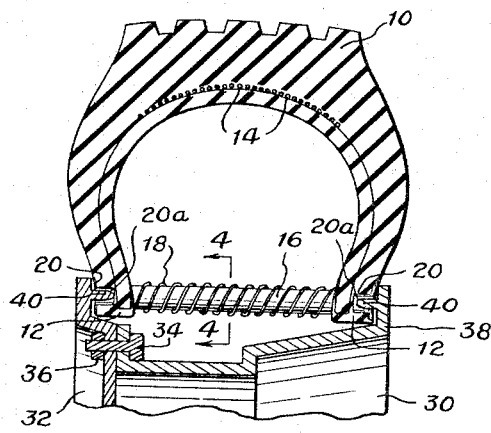
FIGURE 3 is a similar view of the tire mounted on the wheel.

The tire thus described is adapted to be mounted on a split wheel analogous to that disclosed by Costello U.S. Patent No. 1,394,252. As shown in FIGURES 2 and 3, wheel 30 has a separable wheel side 32 which is adapted to be secured to the wheel 30 by means of bolts 34 and nuts 36. According to this invention, wheel 30 also has wheel flanges 38 from which project pins 40 in a number and in positions corresponding to the sockets 20 in the rim portions of the tire 10.

When the tire is mounted on the wheel, the separate side 32 is bolted to the wheel 30 while at the same time pins 40 are seated in sockets 20. In so doing, the rim portions 12 are brought toward each other from the position in FIGURE 2 to that of FIGURE 3 and compressing the struts 16 and the spring 18. As shown in FIGURE 2, spring 18 loosely engages the struts 16. However, when the bead portions are brought toward each other, as in FIGURE 3, the strut 16 slightly increases in diameter so that it becomes tightly engaged with spring 18 whose coils have been compressed. Thus a rigid strut is formed between the bead portions when the tire is mounted on the wheel. At the same time, the struts exert an outward pressure of the bead portions 12 against the rim flanges 38. This tends to hold the tire firmly on the rim of the wheel, while at the same time, the pins 40 securely hold the tire in place on the rim of the wheel. Furthermore, the wheel hangs from the pins 40 seated in the sockets 20 in the upper half of the tire as well as bearing on the pins in the lower half of the wheel. In so doing, the entire circumference of the tire positively supports the wheel as compared to conventional tires which support the wheel on the lower half of the tire only.

Having now described the means by which the objects of the invention are obtained,

I claim:

1. A vehicle tire comprising a wire reinforced body extending between a pair of bead portions forming the inner rim of the tire, said beads being spaced a distance greater than the width of the wheel to which the tire is adapted to be attached, a plurality of flexible struts secured between said bead portions around the periphery of said inner rim, and compression spring means surrounding each strut for exerting outward pressure on said bead portions when the bead portions are brought toward each other as the tire is mounted on a wheel.

2. A tire as in claim 1, further comprising socket means in said bead portions for receiving holding pins on the wheel.

3. A tire as in claim 2, said socket means being aligned with said struts, respectively.

4. A tire as in claim 3, said struts comprising rubber tubes vulcanized to said bead portions.

5. In the combination of a split wheel having rim flanges and a tire having bead portions mounted on said wheel between said rim flanges, the improvement comprising a plurality of sockets in said bead portions, and corresponding pins secured to said rim flanges and seated in said sockets.

6. In the combination of claim 5, further comprising strut means between said bead portions and aligned with said sockets.

7. In the combination of claim 6, further comprising compression spring means surrounding said strut means for urging said bead portions into tight engagement with said rim flanges.

References Cited

UNITED STATES PATENTS

| | | | |
|---|---|---|---|
| 1,396,778 | 11/1921 | Parham | 152—385 |
| 2,749,959 | 6/1956 | Kunel | 152—202 |

ARTHUR L. LA POINT, Primary Examiner.

C. W. HAEFELE, Assistant Examiner.